United States Patent [19]

Akers et al.

[11] 4,034,819
[45] July 12, 1977

[54] ELECTROMAGNETIC COMPENSATING BALANCE

[75] Inventors: Clifford B. Akers, San Jose; Roy A. Applequist, Sunnyvale; James E. Applequist, Saratoga; D. James Guzy, Menlo Park, all of Calif.

[73] Assignee: Arbor Laboratories, Inc., Palo Alto, Calif.

[21] Appl. No.: 641,152

[22] Filed: Dec. 15, 1975

[51] Int. Cl.² .......................................... G01G 7/00
[52] U.S. Cl. ............................ 177/210 C; 177/212
[58] Field of Search ............................ 177/210, 212

[56] References Cited

U.S. PATENT DOCUMENTS

| 3,133,606 | 5/1964 | Thomson | 177/210 |
| 3,604,525 | 9/1971 | Blethen | 177/210 |
| 3,680,650 | 8/1972 | Zimmerer | 177/210 |

*Primary Examiner*—Joseph W. Hartary
*Attorney, Agent, or Firm*—Limbach, Limbach & Sutton

[57] ABSTRACT

An electromagnetic compensating balance for the measurement of forces having a permanent magnet circuit assembly with an annular enclosed housing and with a central core defining a narrow annular air gap between a portion of the housing and core, and having a movable bobbin concentrically arranged around the core with a coil located in the air gap, the bobbin having end portions projecting above and below the housing which are connected to leaf support members for independent support of the bobbin from the magnet assembly, the upper end portions being connected to a weighing pan for weighing samples. The balance has sensing means comprising a first pair of capacitor rings located above said coil and a second pair of capacitor rings located below said bobbin connected in a manner which eliminates canting effects in said bobbin from a reference position, said sensing means generating a transducer output voltage representing an analog to displacements in the bobbin, said output voltage controlling a servo system for generating a d.c. current through the coil which activates the coil to create a compensating equilibrium force by the bobbin opposing the force of the weighing sample, the servo system having circuit means for providing an analog voltage representing current level said analog voltage controlling an analog to digital measuring circuit which operates with said servo circuit means but is independent thereto.

12 Claims, 1 Drawing Figure

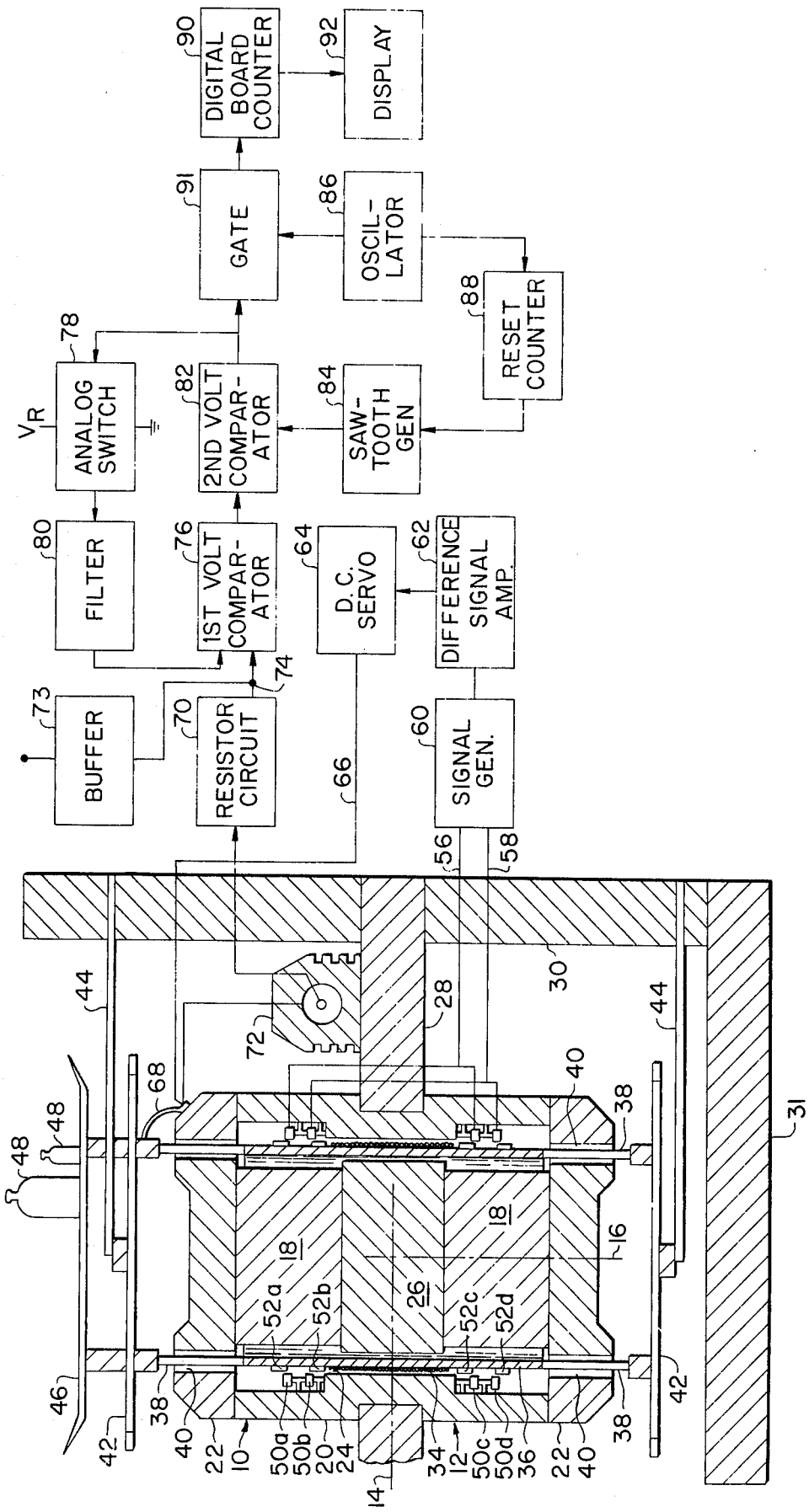

ELECTROMAGNETIC COMPENSATING BALANCE

BACKGROUND OF THE INVENTION

This invention relates to an electronic balance of the electromagnetic compensating type for the accurate measurement of forces, particularly for the measurement of forces generated in the weighing of masses. In particular, this invention relates to an improved electronic circuit arrangement including a more sensitive transducer sensing means and a bifurcated operating circuit which separates the force compensating function from the measuring function. The sensitivity of electromagnetic compensating balances is dependent on means to accurately sense minute displacements of a movable member relative to a reference point, circuit means to develop a defined compensating current, and means to accurately measure the electrical energy necessary to maintain the movable member at an equilibrium level. By improving the sensitivity of the transducer means to determine the location of the movable member and by making the means for compensating for the force to be measured independent of the measuring means, tolerance and error levels can be isolated and minimized.

Prior art electromagnetically compensated balances have reached a performance level which surpasses more conventional spring or knife edge balances in the accurate measuring of forces. Electromagnetically compensated balances utilize a permanent magnet circuit coupled to an electromagnetic circuit to generate a compensating force opposing the loading force on a movable member during a weighing operation. The arrangement is similar to a voice-coil actuator in that a coil wound bobbin is movable with reference to a stationary permanent magnet assembly. For use as a balance device, the coil is located with reference to the magnet assembly by a sensing means. Displacement of the coil by loading with a mass to be weighed is immediately sensed and inhibited by an appropriate d.c. current supplied to the coil to drive the coil to an equilibrium position. The weight of the mass is determined by measuring the d.c. current applied to the coil.

In prior art devices, the sensing means has comprised a pair of capacitor rings mounted with respect to the movable member on which the coil is mounted such that displacement in the movable member is reflected in changes in capacitance, one capacitor ring increasing in capacitance and the other decreasing. Because of the structural arrangement of the coil with respect to an annular air gap in the magnet assembly, the capacitor rings are necessarily located one above and one below the coil. The uniform spatial displacement compensates for error functions introduced by dimensional changes in the materials, occurring from temperature changes or other environmental or physical causes. However, because the movable member is suspended in the air gap and displaced from the magnet assembly, canting of the movable member may position one capacitor ring element closer to the reactive element on the movable member, thereby introducing an error producing inconsistency by the resulting change in capacitance. Additionally, local inconsistencies such as temperature gradients, bonding material and other factors affecting dielectric constants of one or the other capacitor rings are compensated by the paired arrangement.

Prior art methods of developing a compensating energy level in response to a sensed displacement have included circuits for generating compensating current pulses having a constant amplitude and a length that varies according to the extent of displacement of a movable member from its no-load position. The compensating current pulses are delivered to the coil and are concurrently measured by a high frequency counter pulse generator and a counter which counts during the length of the compensating current pulses.

The integral nature of the circuit means for developing the compensating current and the means for measuring the duration of the current pulses create an interdependence which is difficult to diagnose and correct when operating improperly. Such arrangements also require a specifically tailored counter means compatible to the compensation current means. These and other considerations have made the electromagnetic balance of this invention more versatile than prior art devices.

SUMMARY OF THE INVENTION

The electromagnetic compensating balance of this invention utilizes an improved sensing means and force compensating circuit for more accurate measurement of forces created in weighing masses. Use of a symmetrical arrangement of the physical components in the stationary permanent magnet assembly and the movable electromagnetic coil assembly reduces systematic errors otherwise introduced by lack of uniformity in the generated magnetic fields. Measurements of a compensating energy level are made when the movable member is returned to an equilibrium condition having a minimized displacement from the no-load position. The constricted operating range optimizes utilization of a uniform magnetic field. Because determination of the equilibrium condition is critical and is dependent on an accurate determination of displacement, an improved sensing means have been developed.

The structure of the permanent magnet assembly and location of the annular air gap with respect to the compensating coil on the movable member requires that the sensing means be displaced from an idealized center location at the coil. While the use of two displaced annular capacitor rings above and below the coil provides satisfactory results, it has been discovered that if two capacitor rings are mounted in the magnetic structure and located above the position of the coil on the movable member and two capacitor rings are similarly mounted below the coil, and each of the upper rings is coupled to one of the lower rings, any change in capacitance, i.e. caused by canting of the movable member as opposed to displacement on a vertical axis, is compensated by a concurrent change in capacitance in the immediately adjacent capacitor ring.

When a weight is placed on a weighing pan supported by the movable member, a displacement in the movable member is sensed by the capacitor rings, one set increasing in capacitance and one set decreasing. A control voltage developed from this differential provides an activating control for a d.c. servo loop which generates a d.c. current sufficient to return and maintain the movable member at an equilibrium condition. A separate circuit includes a analog digital counter for measuring the energy level of the compensating current to provide a digital readout equivalent to the weight measured. Conventional storage means and auxiliary logic circuits may be included to provide tare functions for eliminating vessel weights or for cumulative measurement of successive samples as disclosed in the art.

Because the measurement circuit comprises a separate circuit from the force compensating circuit, operating on an analog of the driving current, the circuits can be separately maintained and applied. As an example of separate application, the analog output of several different electronic balances may be supplied as input for successive or cumulative measurement in a single measuring circuit. Alternately the analog output may be stored or measured in a wholly auxiliary component. These and other advantages will be apparent from a detailed consideration of the invention set forth in the drawings and following description.

BRIEF DESCRIPTION OF THE DRAWING

The FIGURE is a schematic view of the electromagnetic balance with a diagrammatic schematic of the accompanying circuitry.

DETAILED DESCRIPTION OF THE PREFERRED EMBODIMENT

Referring to the schematic illustration of the drawing, a cross sectional view of the active structural assembly of the electromagnetic balance and a diagrammatic schematic of the electronic arrangement are shown. The electromagnetic balance, designated generally by numeral 10, includes a permanent magnet circuit structure 12 which is generally symmetrical in arrangement across a center plane 14 and around a central axis 16. The magnet circuit structure includes permanent magnets 18 and an annular outer housing 20 with end caps 22 which form an enclosure. The magnetic circuit generates an intense field across a narrow-centrally located air gap 24 formed between a constriction in the outer housing 20 and an enlarged soft iron core 26. The magnet structure is supported by a support plate 28 connected to a vertical support structure 30, such as a housing panel mounted to a base 31.

Located within the annular air gap 24 is a coil 34 which is tightly wound on the central portion of a movable member 36 or bobbin. The bobbin is concentrically arranged around and displaced from the core 26 and magnets 18, which form the columnar central core structure of the magnet assembly. The bobbin 36 extends the length of the overall magnet structure and is movable relative thereto. Tab-like support extensions 38 at both ends of the bobbin 36 project through apertures 40 in the end caps 22 of the magnet structure. The support extensions 38 connect to a suspension frame 42 at each end of the bobbin, which frames 42 in return are connected to thin resilient cantilever members 44 mounted from the vertical structure 30. In this manner, the bobbin is supported generally independent of the magnet structure such that it is linearly displaceable within a limited range along the vertical axis. The mass of the bobbin and suspension means is minimized to reduce inertial and gravitational effects which impede response of the coil driver bobbin to drive signals.

At the top end of the bobbin structure connected to the support extensions 38 is a weighing pan 46 on which samples 48 to be weighed are placed. In operation, the bobbin 36 fixes on a reference position relative to the magnet structure. Preferably, this centrally locates the coil 34 on the central cross axis for reasons of operational symmetry thereby taking advantage of optimum conditions in the magnetic field. When a weight is placed on the pan, the dynamic loading causes a downward displacement in the bobbin. A corrective or compensating current is supplied to the coil of the bobbin to return the bobbin to an equilibrium position approaching the reference position. The initial displacement determines the approximate reactive energy surge supplied to the coil. Weight measurement, however, is determined after return to the equilibrium position.

In order to accurately sense the predefined reference position, sometimes called the no-load position, highly sensitive capacitor rings 50a, 50b, 50c, and 50d are mounted on the inside of the annular outer housing. Since the sensing means cannot be located at the structurally optimum central plane 14, the rings are located uniformly above and below the air gap 24 and coil 34 which occupy this optimum location. Formerly, only two rings had been provided, one above and one below the central plane. While this provided an adequate compensation for dimensional changes along the vertical axis 16 caused, for example, by thermal expansion, errors due to canting, i.e. skewing from the vertical axis remained. Such errors arise when one ring is physically positioned transversely closer to a ground plate on the movable member than is the other thereby changing capacitance. In the present invention, adjacently arranged capacitor rings 50(a, b, c and d) are positioned in pairs above and below the central plane opposite cooperating ground projections 52 (a, b, c and d) on the movable member. Select rings, i.e. 50a and 50c, and 50b and 50d, are electrically coupled as illustrated in order to virtually eliminate any incorrect sensing readings attributable to canting or other parameter changes. Each of the two circuit lines from the capacitor rings thereby has one ring in each of the paired ring arrangements, such that both circuit lines are mutually affected by canting, etc. as well as dimensional changes on the vertical axis.

With reference to the diagrammatic portion of FIG. 1, the lines 56 and 58 of the capacitor circuit are connected to a signal generator 60, which in conjunction with the capacitors and other conventional circuitry forms a transmitter circuit for generating voltage signals reflecting the respective capacitance in the ring sets. Since the capacitance in the ring sets changes on displacement of the bobbin from a reference point, one set displaying an increase in capacitance and one set displaying a decrease, the capacitor rings 50 in conjunction with the signal generator 60 comprise a transducer for continuously determining displacement. The generator 60 also includes a bias means for mutual adjustment of the capacitance effect for altering the reference point or position of the bobbin, and line amplifiers amplifying the output signals.

The two voltage signals are sent to a difference signal amplifier 62 which operates cooperatively with the signal generator to generate an amplified variable d.c. transducer output voltage defined by the difference between the two representative voltage signals of the transmitter circuits and hence a polarized analog of displacement of the bobbin.

The transducer voltage comprises a control voltage for a d.c. servo 64. The d.c. servo includes a conventional high gain amplifier which generates the current necessary to drive the bobbin coil 34, and includes known lead and lag networks to inhibit hunting and excessive reactance. The current level of the d.c. servo provides a monitored direct current input to the coil 34 through line 66 and flexible leaf-lead 68. From the coil the current is delivered to a resistor circuit 70 which includes a large stable resistor 72 (shown in the schematic illustration), a thermal resistor for compensating for system temperature changes and a calibration potentiometer.

From the resistor circuit there is a voltage analog output 74 which provides a voltage output that is representative of the actual d.c. current applied to the coil in reactance to a weight placed on the measuring pan 46.

This analog voltage output is utilized for a control voltage in an auxiliary measuring system, for storage, for operation of a plotter, or for system test purposes and so forth. When used externally, the analog voltage is first applied to a buffer 73. To digitally determine the value of the analog voltage, the analog output 74 is connected to one input of a first voltage comparator 76. The other input of the first voltage comparator 76 is connected through a filter 80 to the output of an analog switch 78.

The output of the voltage comparator 76 is connected to a second voltage comparator 82. The other input of the second voltage comparator 82 is connected to the output of a saw tooth generator 84 to introduce a time base into the loop. The resulting output of the second voltage comparator 82 is a pulse length modulated signal, which is connected to the input of the analog switch 78. This loop is such that the pulse length modulated signal will vary in length according to the analog voltage output 74.

A precision reference voltage applied to the analog switch 78 provides a standard for the output of the analog switch. The pulsed output when filtered thereby matches the analog voltage.

The reset counter 88 reduces the frequency by a fixed ratio which allows the frequency of the saw-tooth generator to be tied to the oscillator frequency to eliminate drift factors in the oscillator. The oscillator also is connected to a digital board counter 90 which digitally measures the pulse length modulated signal of the second voltage comparator 82 through a gate 91. By defining a count time period such that the numerical count is a decimal representation of the weight, i.e. grams, or ounces, the count can be stored, averaged and displayed in a digital display 92.

In addition to the above measuring means which has been included to describe the preferred method of converting the analog signal with the necessary accuracy for precision measurement, conventional circuit logic can be included to provide for tare operations.

What is claimed is:

1. An electromagnetic compensating balance device for measuring forces comprising:
   a stationary permanent magnetic circuit means for generating a magnetic field;
   an electromagnetic coil means movably mounted in said stationary magnetic circuit means for displacement relative thereto, said coil means including structural means for orienting said coil means with respect to said permanent magnet means for limited linear displacement on a predetermined axis;
   transducer means mounted partially on said magnet circuit means and partially on said coil means for detecting displacements of said coil means relative to said stationary magnet and circuit means and defining a reference position of said coil with respect to said permanent magnet means, said transducer means including first means for compensating for error producing dimensional changes in said coil structure means along said axis and second means for compensating for positional changes of said coil structure means skew to said axis and for local environmental changes;
   transducer circuit means cooperating with said transducer means for generating a transducer output signal related to displacements of said coil means from said reference position;
   servo circuit means controlled by said transducer output signal for generating a direct current signal for driving said coil means toward said reference position; and
   coil circuit means connecting said servo circuit means and said coil means for applying said current signal to said coil and actuating said coil toward said reference position, said coil circuit means including circuit means for providing an analog output signal representative of the magnitude of said direct current signal.

2. The balance device of claim 1 comprising further measuring circuit means coupled to said analog output circuit means for measuring said analog output, and generating a readable output measurement of a directional force applied to said coil means.

3. The balance device of claim 2 wherein said analog output signal is a d.c. voltage signal and said measuring circuit means includes buffer means inhibiting interference with said analog output circuit means and said coil circuit means.

4. The balance device of claim 3 wherein said measuring circuit means includes an analog to digital converter.

5. An electromagnetic compensating balance device for measuring forces comprising:
   a stationary permanent magnetic circuit means for generating a magnetic field;
   an electromagnetic coil means movably mounted in said stationary magnet circuit means for displacement relative thereto, said coil means being generally cylindrical with a central axis and said permanent magnet means surrounding said coil means coaxially with said axis;
   structural support means interconnecting said permanent magnetic and coil means at both ends of said coil means for orienting and guiding said coil means along said axis;
   transducer means comprising two sets of capacitor rings spaced apart axially of said coil at symmetrical positions with respect to the ends of the coil with each of said sets of capacitor rings including a first pair of rings mounted on said coil coaxial with said axis and a second pair of rings mounted on said permanent magnet coaxial with said axis and with the rings of one pair positioned axially of said coil between the rings of the other pair, said transducer means defining a reference position of said coil with respect to said permanent magnet means, whereby displacements of the coil means relative to the stationary magnet circuit means may be detected;
   transducer circuit means cooperating with said transducer means for generating a transducer output signal related to displacements of said coil means from said reference position;
   servo circuit means controlled by said transducer output signal for generating a direct current signal for driving said coil means toward said reference position and coil circuit means connecting said servo circuit means and said coil means for applying said current signal to said coil and actuating said coil toward said reference position, said coil circuit means including circuit means for providing an analog output signal representative of the magnitude of said direct current signal.

6. An electromagnetic compensating balance device for measuring forces comprising:

a stationary permanent magnet circuit assembly comprising an annular substantially enclosed outer housing and an inner concentric core wherein a narrow air gap with a central axis is defined between at least a portion of the housing and a portion of the core;

a movable annular bobbin member arranged between the housing and the core, the bobbin member having means connected thereto for supporting weighing samples external of said outer housing;

a coil means mounted on said bobbin member and situated substantially in said air gap for generating an electromagnetic field and actuating displacements in said bobbin;

transducer sensing means for detecting displacements of said bobbin member relative to said magnet assembly comprising:

a first pair of annular capacitor means on said magnet assembly mounted toward one end of said axis from said air gap, said capacitor means on said assembly having cooperating capacitor means on said bobbin;

a second pair of annular capacitor means on said magnet assembly mounted toward the other end of said axis from said air gap, said capacitor means on said assembly having cooperating capacitor means on said bobbin wherein one of said annular capacitor means in said first pair is electrically connected to one of said annular capacitor means in said second pair and the other annular capacitor means in said first pair is electrically connected to the other annular capacitor means in said second pair;

transducer circuit means cooperating with said sensing means for generating a transducer output signal related to displacements of said bobbin member;

drive circuit means controlled by said transducer output signal and connected to said coil means for generating an operating current and activating said bobbin member to an equilibrium position along said axis opposing the force of the weighing sample; and measuring circuit means operable cooperatively with said drive circuit means for measuring signals representative of the force of the weighing sample.

7. The balance device of claim 6 wherein said drive circuit means comprises, servo circuit means for generating a direct current signal related to said transducer output signal to generate a compensating electromagnetic force in said coil opposing the force of the weighing sample, and coil circuit means connecting said servo circuit means and said coil means for applying said current signal to said coil.

8. The balance device of claim 7 wherein said coil circuit means includes circuit means for providing an analog output signal representative of said direct current signal.

9. The balance device of claim 8 wherein said coil circuit means includes further circuit means for adjusting said analog output signal.

10. The balance device of claim 9 wherein said circuit adjusting means includes circuit means for thermal compensation and circuit means for manual calibration.

11. The balance device of claim 10 wherein said measuring circuit means is coupled to said output analog signal.

12. The balance device of claim 11 wherein said measuring circuit means comprises an analog to digital converter.

* * * * *